(12) United States Patent
Ferlitsch et al.

(10) Patent No.: US 8,051,218 B2
(45) Date of Patent: Nov. 1, 2011

(54) METHODS AND SYSTEMS FOR OUTLYING PERIPHERAL DEVICE MANAGEMENT

(75) Inventors: Andrew Rodney Ferlitsch, Camas, WA (US); Mary Louise Bourret, Portland, OR (US); Harold Scott Hooper, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 177 days.

(21) Appl. No.: 12/432,663

(22) Filed: Apr. 29, 2009

(65) Prior Publication Data

US 2010/0281188 A1 Nov. 4, 2010

(51) Int. Cl.
*G06F 3/00* (2006.01)
*G06F 1/24* (2006.01)
*G06F 9/00* (2006.01)
*H04N 1/40* (2006.01)

(52) U.S. Cl. .......... 710/18; 710/19; 358/3.22; 713/100
(58) Field of Classification Search .................. None
See application file for complete search history.

(56) References Cited

U.S. PATENT DOCUMENTS

| | | | | |
|---|---|---|---|---|
| 5,487,180 | A * | 1/1996 | Ohtake | ............... 455/522 |
| 5,596,390 | A * | 1/1997 | Sawada | ................. 399/8 |
| 6,317,848 | B1 | 11/2001 | Sorens | |
| 7,200,613 | B2 | 4/2007 | Schlonski | |
| 7,274,473 | B2 | 9/2007 | Parry | |
| 7,782,774 | B2 * | 8/2010 | Cheriton | ............. 370/232 |
| 2001/0047416 | A1 * | 11/2001 | Yoshimura | ............. 709/226 |
| 2007/0014614 | A1 | 1/2007 | Yoshida | |
| 2007/0035901 | A1 * | 2/2007 | Albrecht et al. | ............... 361/61 |
| 2007/0088688 | A1 * | 4/2007 | Faulkner et al. | ............... 707/4 |
| 2007/0094527 | A1 * | 4/2007 | Frietsch et al. | ............. 713/340 |
| 2007/0283446 | A1 * | 12/2007 | Yami et al. | ............... 726/27 |
| 2008/0059120 | A1 | 3/2008 | Xiao et al. | |
| 2008/0080873 | A1 * | 4/2008 | Enzien | ................. 399/8 |
| 2008/0082230 | A1 * | 4/2008 | Harvey et al. | ............... 701/29 |
| 2008/0098458 | A2 * | 4/2008 | Smith et al. | ................. 726/3 |
| 2010/0235602 | A1 * | 9/2010 | Chan | ............... 711/170 |

FOREIGN PATENT DOCUMENTS

| | | |
|---|---|---|
| EP | 1033646 | 2/2005 |
| JP | 3161764 | 7/1991 |
| JP | 2004061739 | 2/2004 |
| JP | 02005005839 A * | 1/2005 |
| JP | 2006011231 | 1/2006 |
| JP | 2007114826 | 5/2007 |
| JP | 2007241609 | 9/2007 |

* cited by examiner

*Primary Examiner* — Alford Kindred
*Assistant Examiner* — Ronald Modo
(74) *Attorney, Agent, or Firm* — Michael Blaine Brooks, PC; Pejman Yedidsion; David Ripma

(57) ABSTRACT

Aspects of the present invention comprise systems and methods for detecting and managing peripheral devices that perform outside a given performance envelope. In some aspects, one or more threshold values may be determined prior to or during implementation by heuristic or other methods. These threshold values may then be used to determine device performance. In some aspects, threshold values may relate to performance parameters comprising device failures, consumption levels, output quality and other parameters. In some aspects, multiple threshold values may be used to determine device performance. In an exemplary aspect, a sheet usage threshold, a tone usage threshold and a power usage threshold may be used to determine if a device is an outlying device. In some aspects, performance below an excellence threshold value may indicate that a device has excellent performance.

15 Claims, 8 Drawing Sheets

Device Histogram

| Device | Factor (F1) | Value | Factor (F2) | Value |
|---|---|---|---|---|
| Device 1: | Pages between Jam | 100 | Time between Jam | 2 days |
| Device 2: | Pages between Jam | 150 | "" | |
| Device 3: | "" | 300 | "" | |
| Device 4: | "" | 250 | "" | |
| Device N: | "" | 300 | "" | |

METHODS AND SYSTEMS FOR OUTLYING PERIPHERAL DEVICE MANAGEMENT

FIELD OF THE INVENTION

Embodiments of the present invention comprise methods and systems for detecting and managing peripheral devices that perform outside a given performance envelope.

BACKGROUND

Modern peripheral devices, such as multi-function peripheral devices (MFPs) have the ability to sense and record data related to their performance. Some peripheral devices can sense and record information regarding event faults, errors, click counts and other events. These devices are typically connected to a communication network where they can communicate with other peripherals and computing devices.

SUMMARY

Some embodiments of the present invention comprise methods and systems for detecting and managing peripheral devices that perform outside a given performance envelope. In some embodiments, one or more threshold values may be determined prior to or during implementation by heuristic or other methods. These threshold values may then be used to determine device performance. In some embodiments, threshold values may relate to performance parameters comprising device failures, consumption levels, output quality and other parameters. In some embodiments, multiple threshold values may be used to determine device performance. In an exemplary embodiment, a sheet usage threshold, a toner usage threshold and a power usage threshold may be used to determine if a device is an outlying device. In some embodiments, performance below an excellence threshold value may indicate that a device has excellent performance.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
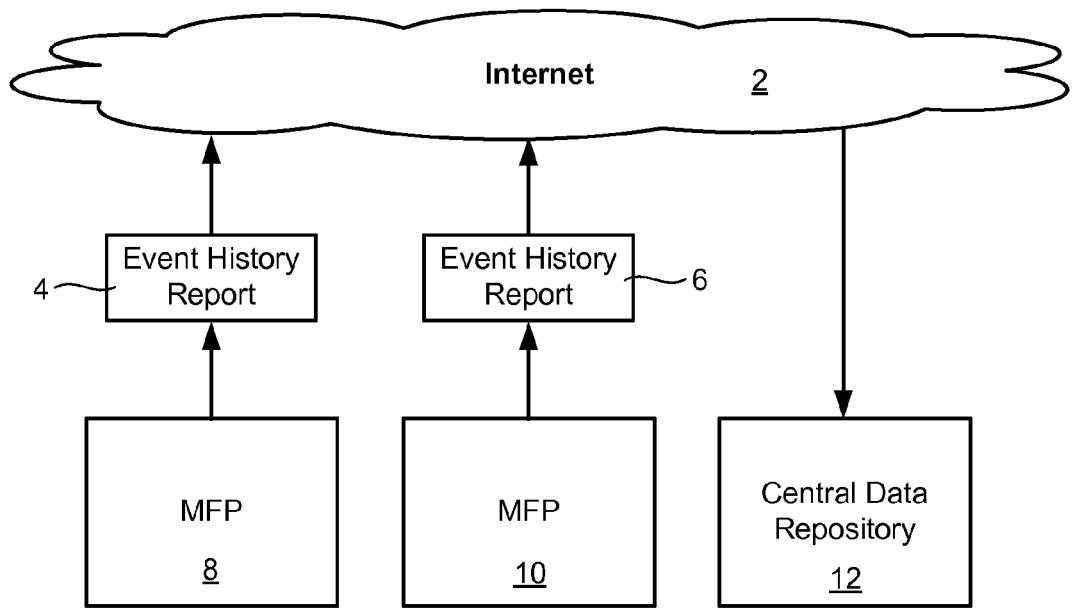
FIG. 1 is a diagram showing an exemplary operating environment.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Exemplary Environment

Embodiments of the present invention may be employed in an exemplary operating environment comprising a plurality of peripheral devices, e.g., MFPs, which are communicatively coupled to a remote resource, such as via the Internet. In these embodiments, each device may be capable of collecting and locally storing information on events including, but not limited to, fault events, click counts, errors, environmental conditions and other information. This data may be stored in a hard drive, non-volatile memory or some other storage mechanism on the device.

In some embodiments, exemplary fault events may comprise:
Paper jams
Input tray failures
Finisher failures
Duplex unit failures
Document feeder failures The information is then sent to a data collection center (DCC). Information may be sent periodically, upon the occurrence of a specific event, upon request or on some other basis. In some embodiments, the data collection center may be hosted remotely, however, in some embodiments, the DCC may be hosted locally. When a remote DCC is employed, each device may have a communication connection with the DCC. This connection may be effectuated over the Internet, by a cellular network or by other methods. In some embodiments, data is packaged using a markup language, such as XML. In other embodiments, data may be recorded in a binary format. This data may be transmitted using a communication protocol, such as HTTP/HTML, SOAP/XML, RSS feed, FTP, Email or others.

In embodiments that employ a periodic data transmission, the period used may be daily, monthly, hourly or some other period suitable for the specific data being transmitted. In some embodiments, the DCC may be hosted by a dealer who leases out the reporting devices, the manufacturer of the devices, a 3$^{rd}$ party service provider or some other party.

In some embodiments of the present invention, events, such as fault events and data related thereto, e.g. internal device climate, are collected for one or more fleets of MFP devices. This data may be aggregated over time at the DCC and may be stored in relation to the MFP model, device components, type of consumables, job type or other parameters. This relation may be maintained in a database or some other relational mechanism. Aggregated data received at the DCC may be programmatically analyzed to identify individual outlying MFP or other devices. An outlying device may be a device whose fault occurrence significantly exceeds a norm for that class of device, component or consumable. An outlying device may also be a device whose fault occurrence significantly exceeds a norm established for other devices in a deployed model class or related group.

In some embodiments, a class or group norm and outlying factors may be determined heuristically from the aggregated data. In other embodiments, a norm and related factors may be determined from pre-existing data obtained for that class or group of devices or components.

Once this performance data has been aggregated and analyzed, a variety of actions may be performed based on the data. For example:
More efficient scheduling of periodic device maintenance.
Identifying excessively faulty components within a subset of models that should be replaced rather than maintained.
Identifying which devices should have a component replaced in a limited recall.

In some embodiments of the present invention, data collected from devices may comprise consumable consumption (sheet, toner, power), waste toner creation, click count information and other information. This information may be used to compare consumable consumption per click count against a target (e.g., corporate) goal. Outlying devices which fail to meet a goal may be identified as well as outlying devices which exceptionally exceed a goal. In some cases, those devices which perform exceptionally may be used as a model to improve the consumption goal of those devices which fail to meet the goal. Additionally, in some embodiments, this consumable data may be used to establish a corporate "green" report card.

The devices of an exemplary embodiment of the present invention may be MFP-type devices, which perform one or more of the following functions:
Print;
Copy;
Scan;
File;
Fax;
Media Duplication;
Publish;
Display;
Format Translation; and
A/V Record/Playback.

In an exemplary embodiment, each device may support collecting fault event, click count and other information. This information may be collected and stored temporarily on the device or on a connected resource. In some embodiments, the information may be stored in a hard drive, removable storage device, flash memory or via a storage service.

In some embodiments, event collection parameters may be configured by a local user/administrator at the device, by a remote service center (e.g., Sharp Remote Service Utility) or by some other method over a communications connection.

In an exemplary embodiment, click count information may comprise:
Page impressions;
Sheets consumed; and
Toner consumption.

In some embodiments, as stated above, data collected by devices, such as MFPs, may be periodically sent to a central repository or DCC. Parameters related to this periodic basis may also be configured by a local administrator, a remote administrator or a remote service. The periodic interval may be fixed at a constant period for a group of devices, set on a device-specific basis or may be dynamically changed based on the conditions of the device. For example, a device which reports an above-average number of fault events may automatically reconfigure to report at a shorter reporting period or interval. In some embodiments, a specific event, an accumulation of specific events, a specific quantity of reported events or a specific combination of events may trigger an automatic adjustment in the reporting period.

Some embodiments of the present invention may be described with reference to FIG. 1, which depicts an exemplary operating environment. In these embodiments, one or more reporting devices such as MFPs 8, 10 are connected via a network 2, such as the Internet to a central data repository or data collection center (DCC) 12. In these embodiments, the MFPs 8, 10 may report an event history report 4, 6, via a network 2 to the DCC 12. Upon receipt of the report at the DCC 12, the report data may be parsed, reconfigured and/or analyzed to determine device performance parameters. In response to an analysis of the report data, the DCC 12 may send a message to one or more MFPs 8, 10 instructing the MFPs 8, 10 to reconfigure reporting parameters or data collection parameters. In some embodiments, DCC 12 may also send a report to an administrator in response to data receipt or analysis results. In some embodiments, the event history reports 4, 6 and/or reports generated by the DCC may be generated or converted to a markup language format such as XML.

Figure 2:
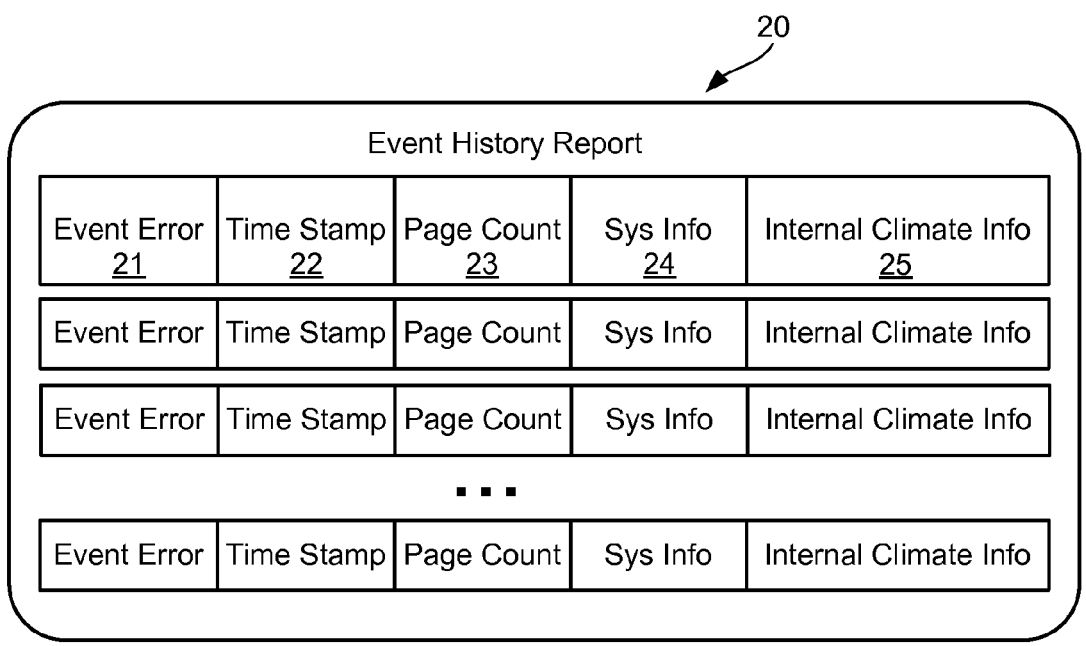
FIG. 2 is a diagram showing an exemplary event history report.

In some embodiments, data collected by the MFPs 8, 10 may comprise information identifying the specific MFP, MFP model, MFP configuration, MFP manufacturer or other MFP data. This data may be used to perform heuristic analyses that may aid in determining a reason or likelihood of a failure or some other event. These events may comprise:
Number of outputted pages since the last fault
Elapsed time since the last fault
Internal climate conditions (e.g., temperature)
General system information In some embodiments, an exemplary event history report 20, illustrated in FIG. 2, may comprise an event type indicator 21, which may identify the type of event, e.g., error type, reported by the system. The event history report 20 may also comprise a time stamp 22, which may indicate the time at which an event occurs and/or the time the report 20 is generated. The event history report 20 may also comprise a page count indicator 23, which may indicate the number of pages output by the device at the time of the event identified by the corresponding event type indicator 21. An exemplary event history report 20 may also comprise a system information field 24, which may comprise data about the reporting device's system configuration including, but not limited to, operating system data, firmware version data, device model, optional components, manufacturer, date of manufacture and other system information. The event history report 20 may also comprise a device internal climate information field 25, which may indicate internal climate conditions such as temperature, humidity, pressure and other data.

In some embodiments, reporting MFPs, or other reporting devices, may comprise sensors to acquire information to report. These sensors may acquire page count data, climate data, time data, event or error data and other information. These sensors may be a permanent part of a reporting device or may be temporary additions to a device. Temporary sensors may be installed by a technician to help identify why an event or error is occurring. In some embodiments, an event or combination of events may trigger the automatic generation of a sensor installation request to have a technician install a specific sensor that will help determine why an event is occurring. These temporary or permanent sensors may help identify a condition that is contributing to an event or error. In some cases, a sensor may be used to determine whether the cause of an event or error is an environmental issue, a defective component or some other problem.

In some embodiments, a central data repository or data collection center (DCC) 12 may generate event reports, e.g., fault reports, which may be compiled on an individual device basis. For example, each MFP device may have a report which is an accumulation of all faults and associated factors since data collection began. In some embodiments, when data collection is on a monthly basis and the system has run for 6 months, the MFP report may be a compilation of 6 monthly reports.

Figures 3, 4:
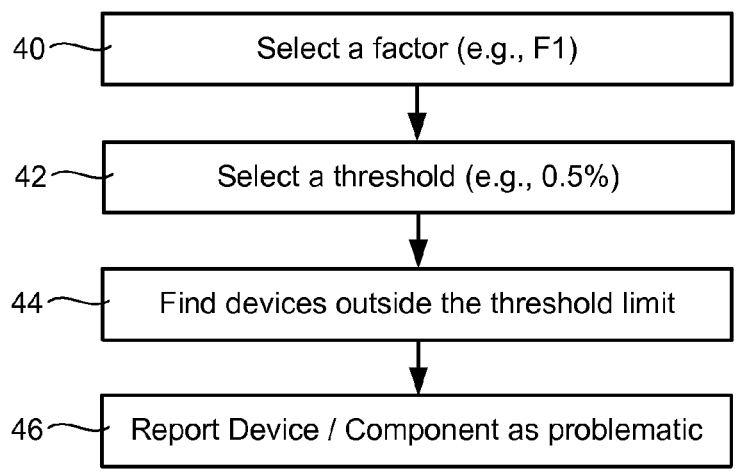
FIG. 3 is a diagram showing an exemplary device histogram.
FIG. 4 is a diagram showing steps of an exemplary method comprising a comparison of device performance to a threshold performance level.

FIG. 3 illustrates an exemplary device report in the form of a histogram of event occurrences. This exemplary report 30 comprises a list 32 of reporting devices that is correlated with one or more lists of factors or events 34, 38 and an occurrence value list 36, 39 which indicates the number of times the associated factor or event has occurred. Other exemplary reports may comprise additional information such as dates of occurrences, climate conditions and other data.

Event-Specific Outlier Determination

In some exemplary embodiments, collected data may be analyzed by the DCC to identify outlying devices. In these embodiments, a histogram may be created on an event-specific or per factor basis. The histogram may be created for all devices of the same model or the same model and configuration, but other device groups may be used. In some embodiments, the histogram may be represented as an X/Y axis graph, wherein X may represent the accumulated event occurrence total for a particular factor over the collection period and Y may represent the number of devices (e.g., percentiles) that have experienced an event occurrence during the collection period.

In some embodiments, the data is then analyzed to identify devices which have one or more accumulated event occurrences that exceed a predetermined threshold for a particular event or factor. For example, a check for outlying devices for the factor: paper jam may be performed. In this case, a threshold might be set, such as 0.5%. A check may then be made for each device within a model class to determine whether it exceeds the threshold. A report may then be generated for each device that exceeds the threshold. This report may comprise:

Device identification data (e.g., account, location, serial number)
Component identification for component associated with the event
Recommendation regarding replacement, maintenance modification, etc.

In some embodiments, the recommendation regarding replacement, maintenance or other action may be determined by establishing a second threshold value, which may exceed the initial threshold value by a wide margin. In an exemplary embodiment, when this second threshold value is exceeded, a component may be scheduled for replacement. Otherwise, the component may be scheduled for modified maintenance, such as an increased maintenance cycle.

In some embodiments, an increase in a maintenance cycle may be proportional to the amount by which the value exceeds the second or initial threshold. In some embodiments, the increase in maintenance cycle may have a logarithmic or exponential relationship to the amount by which the value exceeds the second or initial threshold. In still other embodiments, the increase in maintenance cycle may be modified by a factor that is otherwise related to the number of occurrences of a related event or failure or the value by which this number varies from a threshold value.

In some embodiments, past maintenance data may be used in determining a recommendation regarding maintenance. For example, if a component has a history of low maintenance, an increased maintenance cycle may be recommended. If a component has a history of a normal maintenance cycle or an increased maintenance cycle, yet continues to cause an event at a particular rate, component replacement may be recommended.

Other fault factors may also be considered in making a recommendation regarding maintenance. In some embodiments, if two or more factors exceed threshold values for the same component, the recommendation may be for replacement rather than increased maintenance. If less than two factors exceed a threshold value, the component recommendation may be for increased maintenance.

In a simplified, exemplary embodiment, illustrated in FIG. 4, a factor or event is selected 40 and a threshold related to the selected factor is chosen 42. Event occurrence data for the selected factor may then be analyzed to determine 44 which devices exceed the threshold limit. These outlying devices may be identified 46 in a report, which may also identify a specific component or components related to the event or factor.

Aggregate Event Occurrence Outlier Determination

In some embodiments of the present invention, multiple events or fault factors may be considered in aggregation as well as individually. In some embodiments, each event or factor is first compared to a first threshold. If the number of event or fault occurrences exceeds the first threshold, the device may be considered an outlying device. If the number of event or fault occurrences does not exceed the first threshold, the number of event or fault occurrences is compared to a second threshold, which is lower than the first threshold. If the number of event or fault occurrences exceeds the second threshold, a "poor count" is incremented. This process is repeated for each event or fault factor.

After each event or fault factor is compared to both thresholds, the aggregate poor count is examined. If the poor count exceeds a poor count threshold, the device may be considered an outlying device and a recommendation or report may be generated to effect replacement of an associated component or modify a maintenance plan.

Figure 5:
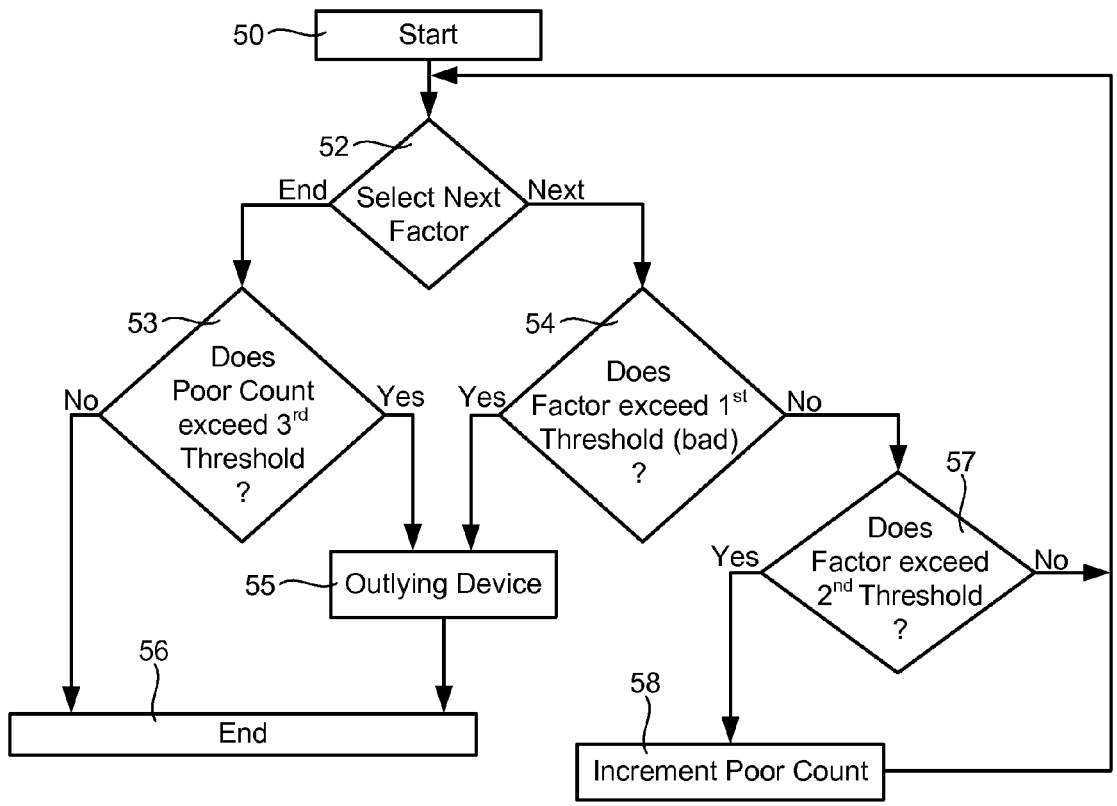
FIG. 5 is a diagram showing an embodiment comprising comparisons with a first and second performance threshold and use of a poor count.

In an exemplary embodiment, illustrated in FIG. 5, the process starts 50 by selecting 52 a factor or event. The occurrence value for that factor or event is then compared 54 to a first threshold. If the value exceeds the first threshold value, the device is considered 55 an outlying device. If the value does not exceed the first threshold value, the occurrence value for the selected factor is compared to a second threshold value 57. If the occurrence value exceeds the second threshold value, a poor count is incremented 58. This process is repeated for multiple factors or events until all factors to be considered are exhausted. If the device has not already been considered an outlying device based on the first threshold value comparison 54, the poor count is compared 53 to a third threshold value. If the poor count has been incremented to exceed the third threshold value, the device may be considered 55 an outlying device. If the poor count does not exceed the third threshold value, the process terminates 56 and the device is not considered an outlying device.

Learned Threshold Outlier Determination

Some embodiments of the present invention may learn an improved or optimal threshold to be used to identify a device as an outlier. In these embodiments, data may be collected over a period of time. During this time, dealers, operators or other parties may make servicing decisions regarding whether to replace a component or increase maintenance of a component. These servicing decisions may be reported back to a DCC 12. At the end of an evaluation period, these servicing decisions may be analyzed to determine an appropriate threshold for a recommendation to replace or increase maintenance on a component. For example, if a component was replaced due to a specific fault occurrence 25 times in 10,000 devices, the threshold for this event/fault may be set to 0.25%. The threshold may also have a weight factor added, multiplied or otherwise used to modify the threshold value and/or relate the threshold value to the event/fault occurrence data. A similar analysis may be used to determine whether to make a recommendation to modify the maintenance schedule for a device.

Figure 6:
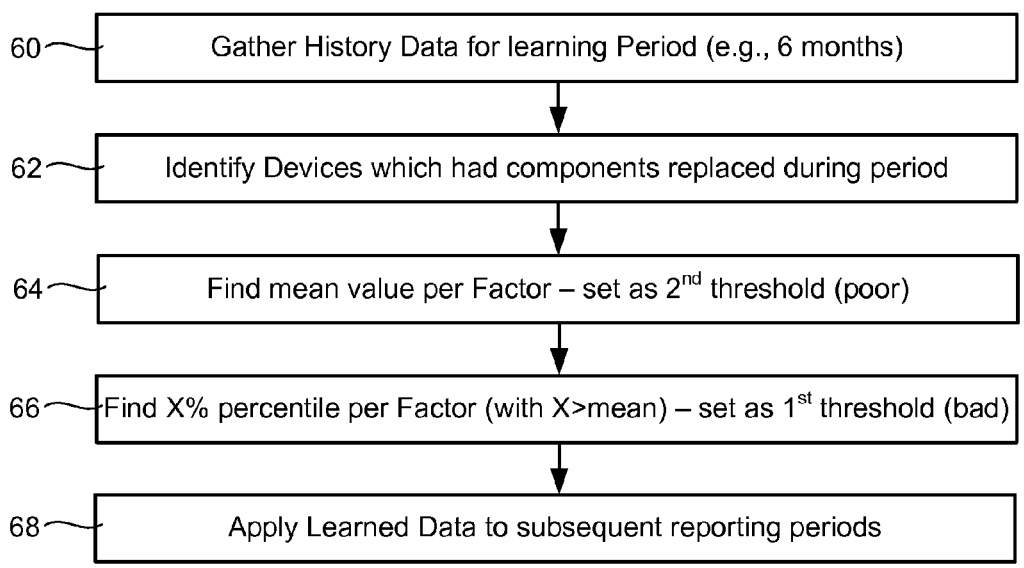
FIG. 6 is a diagram showing an embodiment comprising a learned threshold.

In an exemplary embodiment, illustrated in FIG. 6, history data is gathered 60 over a learning period. Devices which have had components replaced are then identified 62. A mean value per factor may then be determined 64 and used as a second threshold value in determining whether to increment a poor count as discussed above. A percentile may also be established 66 per factor and may be used as a first threshold value in determining whether a device should be directly considered an outlying device based on that single factor. These values determined from data gathered during a learning period may be used 68 in processes described above and other processes. These learned threshold values may also be updated periodically based on new data gathered during subsequent learning periods.

Master Device Firewall Embodiments

In some embodiments of the present invention, a fleet of devices, such as MFPs, is located behind a firewall. This scenario is common in a corporate environment. One device may be designated as a master device and is permitted to send collected data through the firewall to a remote DCC. Other devices within the firewall are not allowed to send information outside the firewall. In an exemplary embodiment, an authenticated master MFP and non-master MFPs may be setup using Sharp Remote Service Protocol (RSP) 1.0.

In these embodiments, a master device/MFP acts as a local data collection center. The non-master devices send their data to the master device within the firewall. In some embodiments, non-master devices may send data periodically on an established schedule. In some embodiments, the master device/MFP may poll the non-master devices for event or fault data.

After data is collected by the master device/MFP, the master device may open a connection through the firewall to the remote DCC. The master device may then upload the collected data for the entire MFP fleet located behind the firewall to the remote DCC.

Figure 7:
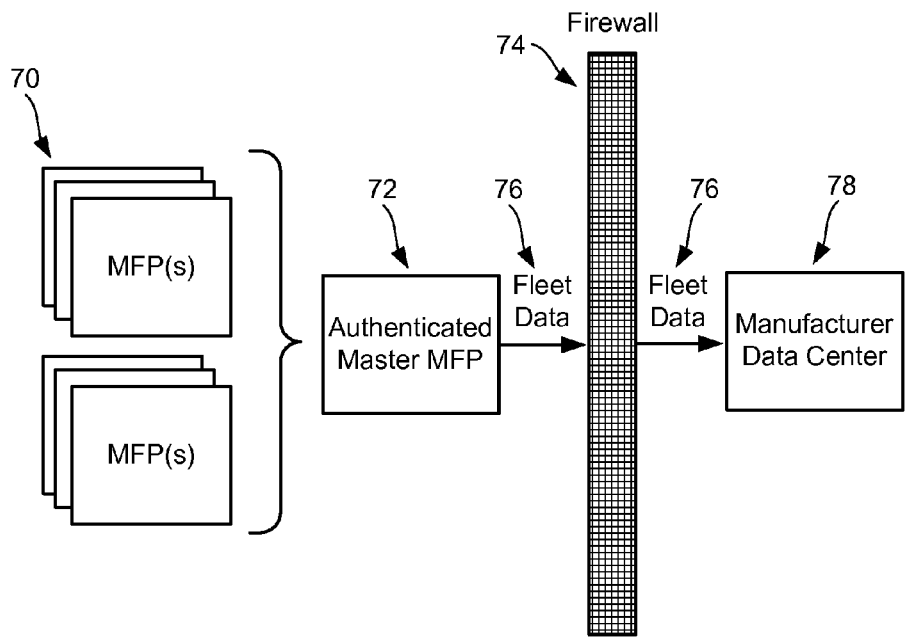
FIG. 7 is a diagram showing an exemplary fleet environment.

In an exemplary embodiment, illustrated in FIG. 7, MFPs 70 are located behind a firewall 74 with a master MFP 72. MFPs 70 send their event/fault data to the master MFP 72. In some embodiments, the master MFP 72 may simply aggregate raw data. In other embodiments, master MFP 72 may process data received from MFPs 70 before transmitting the processed data outside the firewall 74. When sufficient data is received, when an established data collection period has passed or when a message is received from a remote data collection center 78, the master MFP 72 may send the raw or processed data 76 to the remote data collection center 78. The remote DCC may then further process the data, such as report generation or maintenance scheduling.

Dynamic Feedback Embodiments

Some embodiments of the present invention may identify components in specific devices that have an increased failure rate due to localized issues. These issues may comprise:

Individual defect from manufacturing, shipping or handling

Internal climate effects

Excessive wear and tear due to unique or non-routine use of equipment

These localized issues, when known, may alter a recommendation for handling a fault from an otherwise standard recommendation. When these localized issues and related components are identified, the system may monitor for reoccurrence of a fault by the device. If the fault occurs, the device-specific recommendation may be downloaded to the device. The device may then display a device-specific recommendation on its front panel user interface. In other embodiments where the device may be operated from a remote interface (e.g., PC), the device-specific recommendation may be downloaded to the device hosting the remote interface. The device hosting the remote interface may then display a device-specific recommendation on the remote user interface.

In some embodiments, a device may query a remote DCC for any device-specific recommendation due to a detected fault or event. In some embodiments, the remote DCC may pre-load device-specific recommendations by downloading them to the device in advance.

Figure 8:
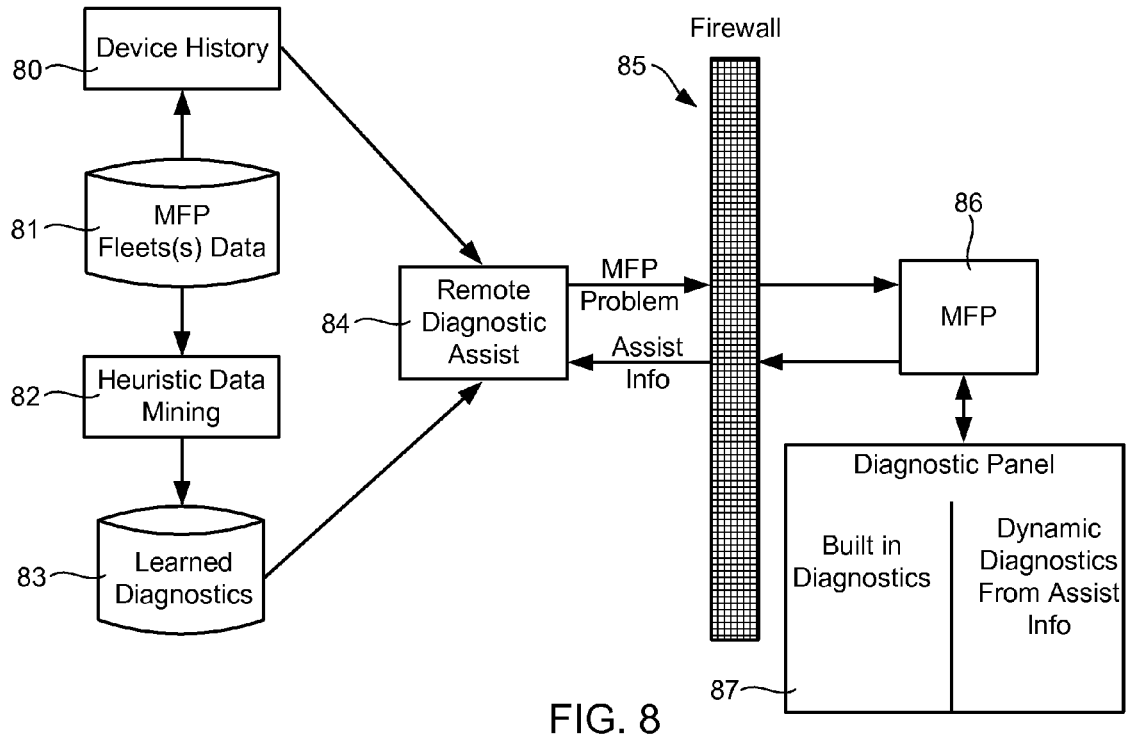
FIG. 8 is a diagram showing an exemplary environment comprising storage for fleet data and learned diagnostics.

In an exemplary embodiment, illustrated in FIG. 8, MFP fleet data 81 may be stored on a remote storage device that is in communication with a remote diagnostic assistant (RDA) 84. The MFP fleet data 81 may comprise an individual device history 80 that may be transmitted to the RDA 84. The device history 80 may have been generated from reports received from specific devices. Some embodiments may also comprise a heuristic data mining process 82 that may operate on the MFP fleet data 81 and output learned diagnostics 83, which may also be transmitted to the RDA 84.

When an MFP 86 encounters a problem, the MFP 86 may send a message to the RDA 84. In some cases, this message may be sent through a firewall 85. This problem message may comprise a query for diagnostic information. In response to a problem message from a specific MFP 86, the RDA may access and process the device history 80 for that specific MFP 86 and the learned diagnostics 83 associated with the MFP 86. The RDA 84 may then compile dynamic diagnostic data related to the specific MFP 86 and send this dynamic diagnostic data to the MFP 86. The MFP 86 may then use the dynamic diagnostic data to effect automated processes and/or display the dynamic diagnostic data on an MFP display 87 or remote interface for consumption by a user or maintenance personnel.

Dynamic Reconfiguration

In some embodiments of the present invention, an analysis of each device or MFP in the fleet may be performed. These devices may be initially designed to perform "optimally" in what is presumed to be the center cases. The conditions and use patterns at a specific condition may not well meet the center case for which the device was designed or tuned. In some embodiments, using this device analysis, a system may download firmware changes, from a manufacturer or elsewhere, which may change the operation mode or modes of a specific device to better accommodate a non-center case condition. In some cases, this process may help adjust for problems associated with a specific locale or usage pattern.

For example, if the external climate environment where a device is deployed is significantly outside the manufacturer's recommendations (e.g., ambient temperature) for which the device configuration was optimized, firmware changes may be downloaded to make the device better perform in the climate in which it is deployed. In some embodiments, the firmware changes may effect slowing of the print speed, increasing torque on the paper path rollers, increasing the drum cleansing times, changing the temperature of the fuser, changing the duration of the drying process, and other adjustments.

As another example, one or more devices at a specific location may be regularly printing print files which contain non-standard print data in a printer description language (PDL) that differs from accepted standards. In this case, a change in the interpreter to handle the non-standard PDL may be downloaded to the device.

Toner Waste Embodiments

In some embodiments of the present invention, information may be collected regarding the amount of toner waste that is recovered during cleaning operations between fusing operations. When an image is fused on a sheet of media, some of the toner is left behind on the drum/fusing system. This left-over toner must be cleaned from the fusing system. This waste toner is generally collected and stored in a toner waste container.

In these embodiments, information is collected by a device to determine the amount of waste toner produced as a byproduct of fusing images on sheet media. This determination may be performed in a number of ways.

In some embodiments, each device/MFP may report, during a periodic or other reporting cycle, the toner levels in both the toner cartridge (remaining unused toner) and the toner waste container (wasted toner). This data may be compared to the previous reporting cycle to determine how much toner was used during the period and how much of the used toner was wasted. A ratio of wasted toner to consumed toner may then be calculated. This ratio may then be compared to either a predetermined or heuristically-determined threshold to identify an outlying device based on toner waste.

In some embodiments, a device/MFP may report, during a periodic or other reporting cycle, the toner level in a toner waste container (wasted toner) and the number of page impressions (e.g., sheet surfaces) performed. This data may be compared to a previous reporting cycle to determine how much toner per page impression was used during the period and how much of the used toner per page impression was wasted. A ratio of wasted toner to page impressions may then be calculated. This ratio may then be compared to either a predetermined or heuristically-determined threshold to identify an outlying device based on toner waste.

Other algorithms previously described herein and known in the art may also be used to determine toner waste or other device benchmarks.

Figure 9:
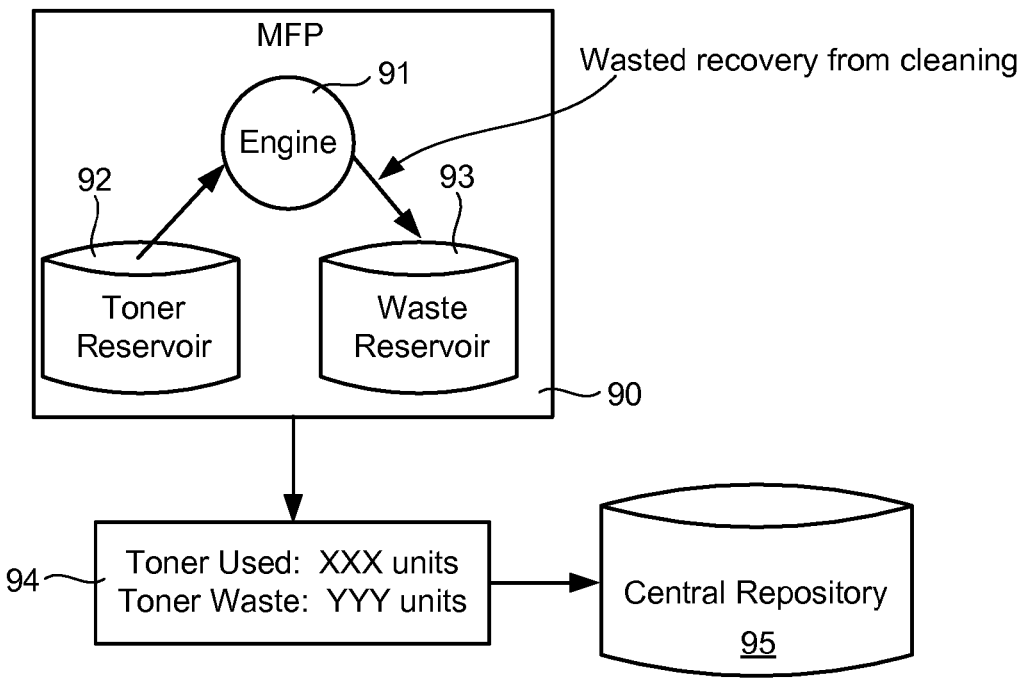
FIG. 9 is a diagram showing an exemplary embodiment comprising an MFP reporting consumption to a central repository.

In some embodiments, illustrated in FIG. 9, a device, such as MFP 90, may comprise a toner reservoir 92, a marking engine 91, and a waste reservoir 93. The MFP 90 may also comprise sensors that measure the quantity of toner in the toner reservoir 92 and the waste reservoir 93. On a periodic basis, on some other schedule or by request, measurements may be performed to determine toner reservoir 92 and waste reservoir 93 levels. These levels may be reported 94 to a central repository or data collection center (DCC) 95 where processing may occur to determine performance parameters of MFP 90, such as toner consumption and waste rates.

Consumption-Related Embodiments

Figure 10:
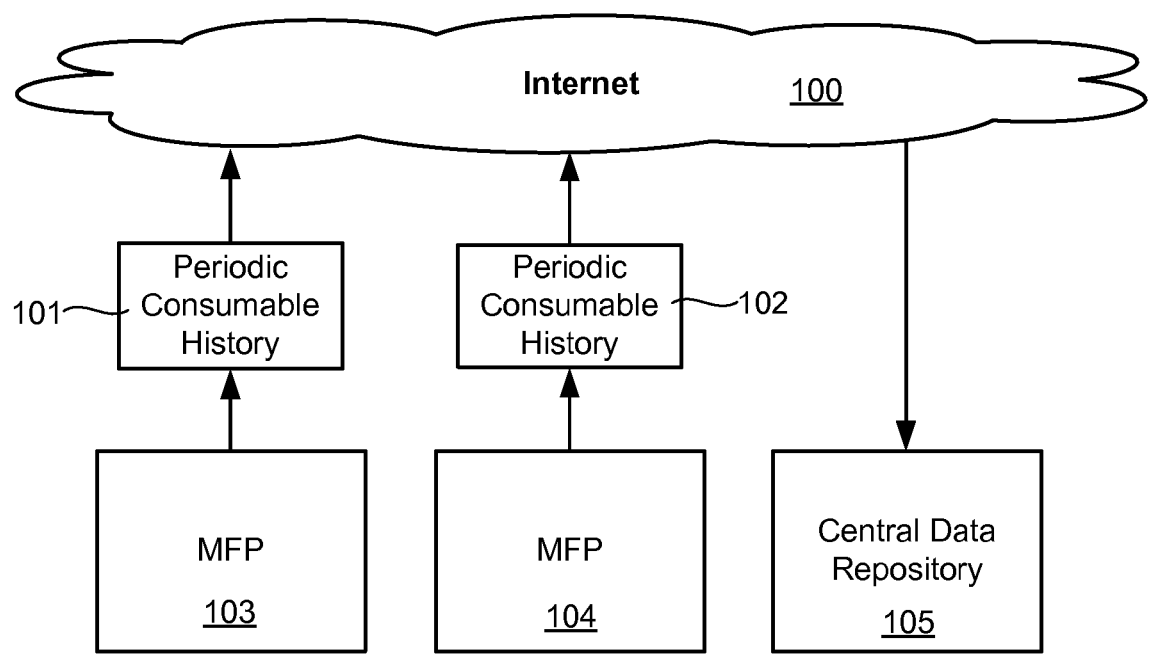
FIG. 10 is a diagram showing an exemplary consumption reporting environment.

In some embodiments of the present invention, information is collected from a fleet of devices/MFPs relating to consumable consumption. This information may be collected as a periodic report from the devices. In some embodiments, this information may comprise:

The number of page impressions printed in a time period
The number of sheets printed in a time period
The amount of toner consumed in a time period
The amount of power used in a time period In an exemplary embodiment, illustrated in FIG. 10, devices, such as MFPs 103, 104 may report their consumption history 101, 102 over a network 100 (e.g., internet) to a central data repository or data collection center (DCC) 105. These consumption reports 101, 102 may be reported periodically or may comprise a time stamp or other time-related data, which may be used to establish consumption rate data.

Figure 11:
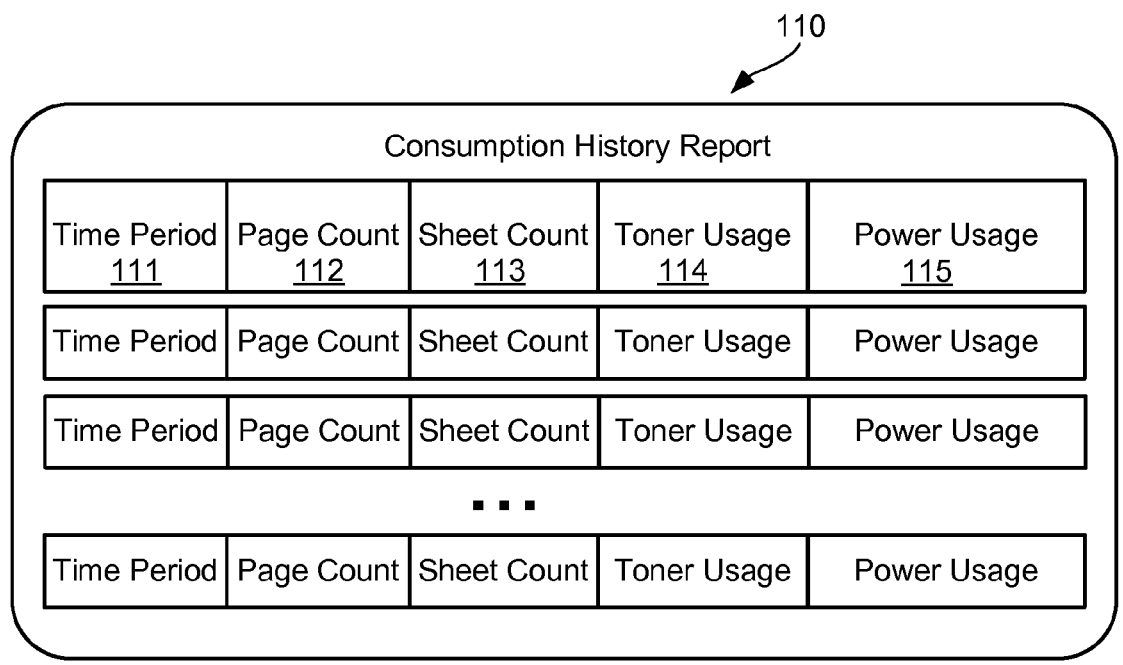
FIG. 11 is a diagram showing an exemplary consumption history report.

FIG. 11 illustrates an exemplary consumption history report 110. In these embodiments, a consumption history report 110 may comprise time data 111, which may comprise a time stamp, period identifier or some other time indicia. A consumption history report 110 may also comprise a page count 112 to identify the number of pages output by a device at the time of the report. Some reports may comprise a sheet count value 113 to identify the number of sheet media used by the device at the time of the report. A toner usage value 114 may also be found in a consumption history report 110 and may indicate the amount of toner used by the device during some identified time period, such as since the last report filing. A consumption history report 110 may also comprise a power usage value 115, which may indicate the amount of power used by the device during a specified time period, such as since the last report filing.

Figure 12:
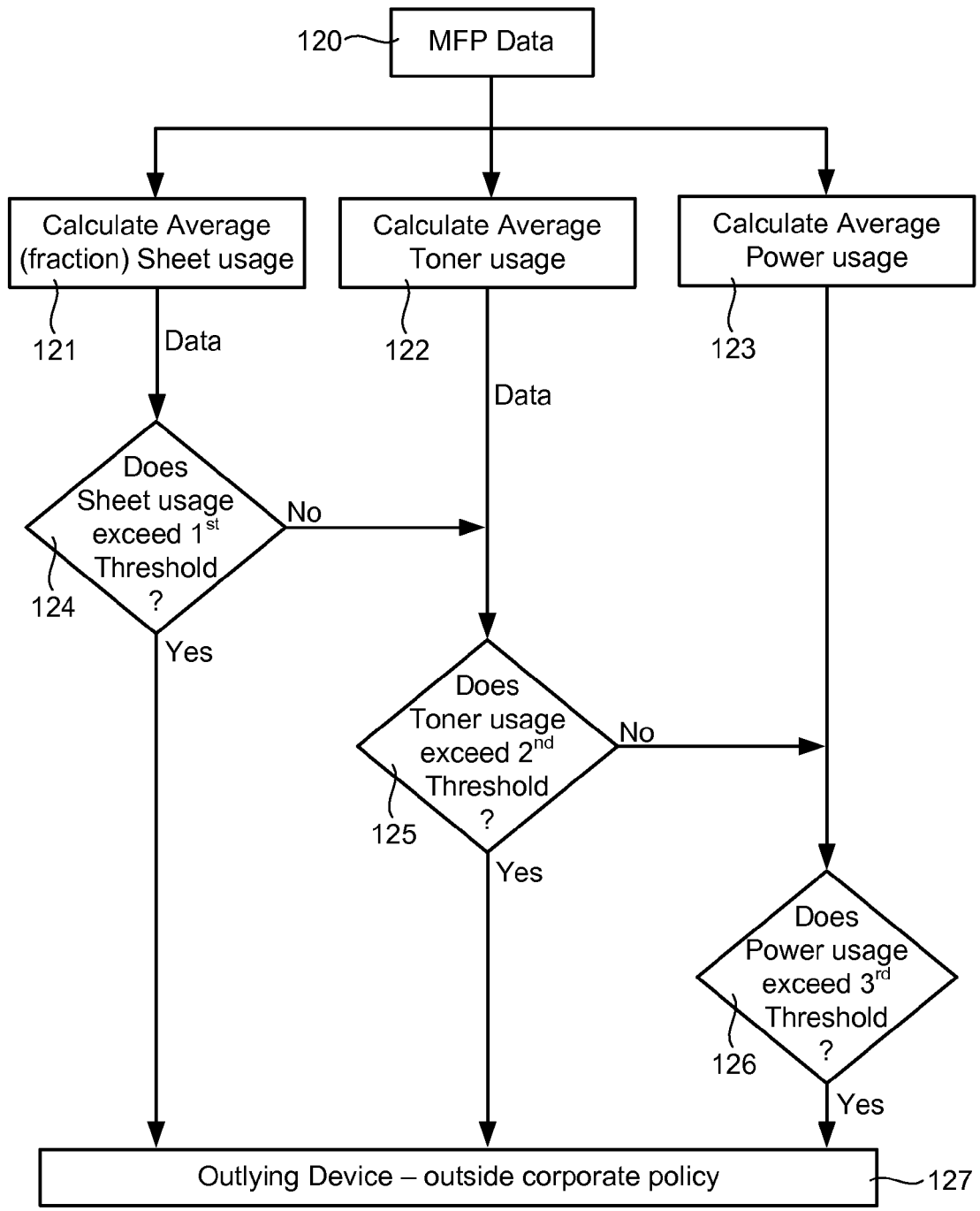
FIG. 12 is a diagram showing an exemplary embodiment comprising use of multiple thresholds for sheet usage, toner usage and power usage.

Some embodiments of the present invention may be described with reference to FIG. 12. In these embodiments, MFP data 120 may be received from an MFP at a DCC or another processing device. Using the raw MFP data 120, a process, such as may be implemented in a DCC, may calculate an average sheet usage per page 121 for the MFP. A process may also calculate an average toner usage per page 122 for the same MFP. The MFP data 120 may also be used to calculate an average power usage per page 123. In some embodiments, these calculations may be based on data in a consumption history report 120. Once these factors are determined, they may be compared to various threshold values to determine if the MFP is an outlying device. The average sheet usage per page 121 may be compared to a first sheet usage threshold 124. If the average sheet usage per page exceeds the sheet usage threshold 124, the MFP may be designated as an outlying device 127. The average toner usage per page 122 may also be compared to a second toner usage threshold 125 and if the average toner usage per page 122 exceeds the second toner usage threshold 125, the MFP may be designated as an outlying device 127. The average power usage per page 123 may also be compared to a third power usage threshold 126. If the average power usage per page 123 exceeds the third power usage threshold 126, the MFP may be designated as an outlying device 127. In these embodiments, an MFP may be designated as an outlying device if any of the sheet usage, toner usage or power usage exceeds established threshold norms. In some embodiments, a combination of these factors exceeding their respective threshold values may be required to classify an MFP as an outlying device.

In some embodiments, information can be compiled on a device-specific basis and aggregated across one or more fleets of devices. The aggregated data may then be used to identify outlying devices that are either poorly utilizing consumables or exceptionally utilizing consumables. This data may be compared to a fleet-wide standard, such as a mean, medium or average for the fleet or some other threshold value established by performance analysis or company policy.

Figure 13:
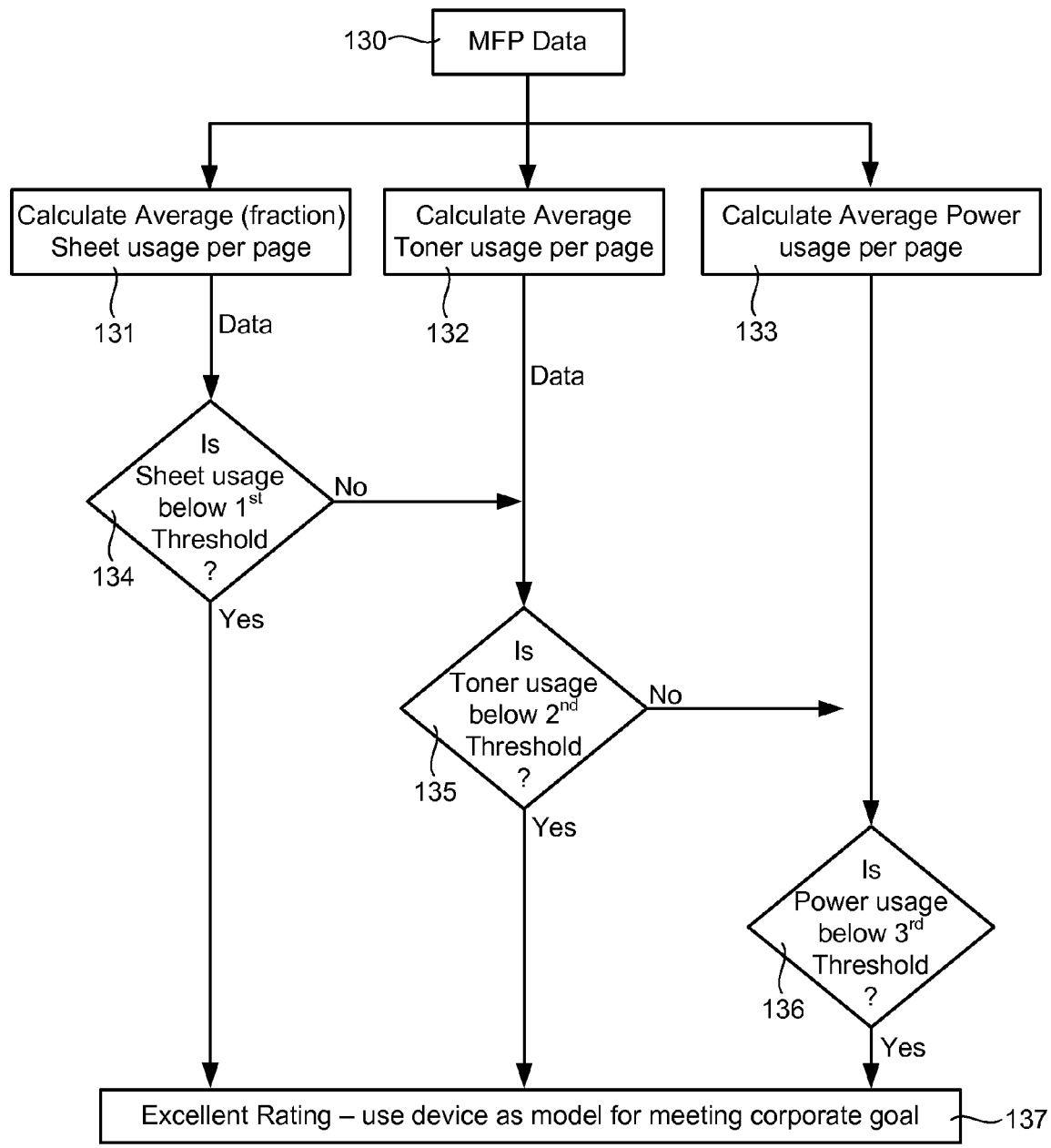
FIG. 13 is a diagram showing an exemplary embodiment comprising determination of performance excellence.

In some embodiments, MFP data may be analyzed to identify exceptionally performing or highly efficient devices. In some of these embodiments, illustrated in FIG. 13, device data, such as MFP data 130 may be received from an MFP at a DCC or another processing device. Using the raw MFP data 130, a processor, such as a DCC, may calculate an average sheet usage per page 131 for the MFP. A processor may also calculate an average toner usage per page 132 for the same MFP. The MFP data 130 may also be used to calculate an average power usage per page 133. In some embodiments, these calculations may be based on data in a consumption history report 130.

Once these factors are determined, they may be compared to various threshold values to determine if the MFP meets a performance standard. The average sheet usage per page 131 may be compared to a first sheet usage threshold 134. If the average sheet usage per page is below the first sheet usage threshold 134, the MFP may be designated as an excellently performing device 137. The average toner usage per page 132 may also be compared to a second toner usage threshold 135 and if the average toner usage per page 132 is below the second toner usage threshold 135, the MFP may be designated as an excellently performing device 137. The average power usage per page 123 may also be compared to a third power usage threshold 136. If the average power usage per page 133 is below the third power usage threshold 136, the MFP may be designated as an excellently performing device 137.

Information from excellently performing devices may be used as a model for improving the performance of poorly performing "outlying devices." For example, the settings and configuration parameters of excellently performing devices may be used to reconfigure poorly performing devices in similar situations. As another example, workloads may be shifted from poorly performing devices to excellently performing devices to increase overall fleet performance.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for evaluating network device performance, said method comprising:
   measuring the performance of at least one network device;
   determining a network device performance value, based on the measured performance of said at least one network device, wherein said at least one network device is connected, via a network, to a data collection center (DCC);
   sending the determined network device performance value from said at least one network device to said data collection center;
   comparing, at said data collection center, the determined network device performance value to a network device performance threshold value;
   designating, by the DCC, said at least one network device as an outlying device when the determined network device performance value exceeds the network device performance threshold value; and
   automatically reconfiguring, by said designated outlying device, a set of operation modes of the designated outlying device, wherein the reconfiguration is based on the measured performance of another network device performing better than the threshold value.

2. A method as described in claim 1 wherein said at least one network device is separated from said DCC by a firewall, and said connection between said at least one network device and said DCC is routed through a master device that is authorized to communicate through said firewall.

3. A method as described in claim 1 further comprising modifying a maintenance schedule for said at least one network device when said at least one network device is designated as an outlying device.

4. A method as described in claim 1 further comprising scheduling said at least one network device for component replacement when said at least one network device is designated as an outlying device.

5. A method as described in claim 1 wherein said at least one network device is a multifunction peripheral (MFP) device.

6. A method as described in claim 1 wherein said network device performance value relates to a period of time between device failures.

7. A method as described in claim 1 wherein said network device performance value relates to consumption of a consumable material by said at least one network device.

8. A method as described in claim 1 wherein said network device performance value relates to power consumption by said at least one network device.

9. A method as described in claim 1 wherein said network device performance value relates to a device fault performed by said at least one network device.

10. A method as described in claim 1, wherein the network device performance value is further based on data in a consumption history report.

11. A method for evaluating network device performance, said method comprising:
   determining first and second network device performance threshold values, wherein said first and second network device performance threshold values relate to a first device factor;
   determining third and fourth network device performance threshold values wherein said third and fourth network device performance threshold values relate to a second device factor;
   determining a fifth network device performance threshold value, wherein said fifth network device performance threshold value relates to a poor count;
   measuring the performance of at least one network device in relation to said first device factor;
   determining a first network device performance value, wherein said at least one network device is connected, via a network, to a data collection center;
   sending said first network device performance value from said at least one network device to said data collection center;
   comparing said first network device performance value to said first network device performance threshold value at said data collection center;

designating said at least one network device as an outlying device when said network device performance value exceeds said first network device performance threshold value;
comparing said first network device performance value to said second network device performance threshold value at said data collection center when said network device performance value does not exceed said first network device performance threshold value;
incrementing a network device poor count value when said first network device performance value exceeds said second network device performance threshold value;
measuring the performance of said at least one network device in relation to said second device factor;
determining a second network device performance value;
sending said second network device performance value from said at least one network device to said data collection center;
comparing said second network device performance value to said third network device performance threshold value at said data collection center;
designating said at least one network device as an outlying device when said second network device performance value exceeds said third network device performance threshold value;
comparing said second network device performance value to said fourth network device performance threshold value at said data collection center when said second network device performance value does not exceed said third network device performance threshold value;
incrementing said network device poor count value when said second network device performance value exceeds said fourth network device performance threshold value;
comparing said network device poor count value to said fifth network device performance threshold value at said data collection center;
designating said at least one network device as an outlying device when said network device poor count value exceeds said fifth network device performance threshold value; and
modifying a maintenance schedule for said at least one network device, based on the measured performance of a network device performing better than the threshold value, when said at least one network device is designated as an outlying device.

12. A method for evaluating network device performance in a system comprising at least one network device connected, via a network, to a data collection center, said method comprising:
determining a sheet usage threshold value;
determining a toner usage threshold value;
determining a power usage threshold value;
measuring the performance of said at least one network device in relation to sheet usage;
determining a sheet usage performance value;
sending said sheet usage performance value from said at least one network device to said data collection center;
measuring the performance of said at least one network device in relation to toner usage;
determining a toner usage performance value;
sending said toner usage performance value from said at least one network device to said data collection center;
measuring the performance of said at least one network device in relation to power usage;
determining a power usage performance value;
sending said power usage performance value from said at least one network device to said data collection center;
comparing said sheet usage performance value to said sheet usage threshold value at said data collection center;
designating said at least one network device as an outlying device when said sheet usage performance value exceeds said sheet usage threshold value;
comparing said toner usage performance value to said toner usage threshold value at said data collection center when said sheet usage performance value does not exceed said sheet usage threshold value;
designating said at least one network device as an outlying device when said toner usage performance value exceeds said toner usage threshold value;
comparing said power usage performance value to said power usage threshold value at said data collection center when said toner usage performance value does not exceed said toner usage threshold value;
designating said at least one network device as an outlying device when said power usage performance value exceeds said power usage threshold value; and
scheduling said at least one network device for component replacement, wherein the scheduling is based on the determined usage of a network device performing better than the usage threshold value, when said at least one network device is designated as an outlying device.

13. A method for evaluating network device performance in a system comprising at least one network device connected, via a network, to a data collection center, said method comprising:
determining a sheet usage threshold value;
determining a toner usage threshold value;
determining a power usage threshold value;
measuring the performance of said at least one network device in relation to sheet usage;
determining a sheet usage performance value by the data collection center;
sending said sheet usage performance value from said at least one network device to said data collection center;
measuring the performance of said at least one network device in relation to toner usage;
determining a toner usage performance value by the data collection center;
sending said toner usage performance value from said at least one network device to said data collection center;
measuring the performance of said at least one network device in relation to power usage;
determining a power usage performance value by the data collection center;
sending said power usage performance value from said at least one network device to said data collection center;
comparing said sheet usage performance value to said sheet usage threshold value at said data collection center;
designating, by the data collection center, said at least one network device as an outlying device when said sheet usage performance value exceeds said sheet usage threshold value;
comparing said toner usage performance value to said toner usage threshold value at said data collection center when said sheet usage performance value does not exceed said sheet usage threshold value;
designating, by the data collection center, said at least one network device as an outlying device when said toner usage performance value exceeds said toner usage threshold value;
comparing said power usage performance value to said power usage threshold value at said data collection center when said toner usage performance value does not exceed said toner usage threshold value;

designating, by the data collection center, said at least one network device as an outlying device when said power usage performance value exceeds said power usage threshold value;

determining an exceptional sheet usage threshold value;

determining an exceptional toner usage threshold value;

determining an exceptional power usage threshold value;

comparing said sheet usage performance value to said exceptional sheet usage threshold value at said data collection center;

designating, by the data collection center, said at least one network device as an exceptional device when said exceptional sheet usage performance value is below said exceptional sheet usage threshold value;

comparing said toner usage performance value to said exceptional toner usage threshold value at said data collection center when said sheet usage performance value is not below said exceptional sheet usage threshold value;

designating, by the data collection center, said at least one network device as an exceptional device when said toner usage performance value is below said exceptional toner usage threshold value;

comparing said power usage performance value to said exceptional power usage threshold value at said data collection center when said toner usage performance value is not below said exceptional toner usage threshold value;

designating, by the data collection center, said at least one network device as an exceptional device when said power usage performance value is below said exceptional power usage threshold value; and automatically reconfiguring, by a network device on said network not designated as exceptional, with configuration parameters from said at least one designated exceptional network device performing better than the threshold value.

14. A method as described in claim 13 further comprising using at least one of said sheet usage performance value, said toner usage performance value and said power usage performance value as a performance model when said at least one network device is designated as an exceptional device.

15. A method comprising:

providing at least one network device comprising a reconfiguration data set;

determining a network device performance value, of the at least one network device, based on a set of performance metrics, wherein the set of performance metrics comprise at least one of: a period of time between device failures, consumption of consumable materials by the at least one network device, power consumption by the at least one network device, a device fault performed by the at least one network device, and data of a consumption history report;

transmitting the determined network device performance value from the at least one network device to a data collection center via a network link;

comparing, by the data collection center, the at least one network device performance value to an associated network device performance threshold value; and designating, by the data collection center, the at least one network device as an outlying device based on the at least one network device exceeding the determined at least one network device performance threshold value, and if the network device performance value exceeds the determined network device performance threshold value then reconfiguring the designated outlying device, by the designated outlying device, a set of operation modes of the designated outlying device, based on configuration data of the at least one network device performing better than the threshold value.

* * * * *